(12) United States Patent
Carlson

(10) Patent No.: US 7,571,266 B2
(45) Date of Patent: Aug. 4, 2009

(54) PERIPHERAL DEVICE IN A COMPUTERIZED SYSTEM AND METHOD

(76) Inventor: Lance R. Carlson, 7949 E. Sussex Ct., Niwot, CO (US) 80503

( * ) Notice: Subject to any disclaimer, the term of this patent is extended or adjusted under 35 U.S.C. 154(b) by 200 days.

(21) Appl. No.: 11/348,079

(22) Filed: Feb. 6, 2006

(65) Prior Publication Data

US 2007/0239908 A1     Oct. 11, 2007

(51) Int. Cl.
*G06F 13/12* (2006.01)

(52) U.S. Cl. ............................ 710/62; 710/25; 713/502

(58) Field of Classification Search .................... 710/62, 710/25

See application file for complete search history.

(56) References Cited

U.S. PATENT DOCUMENTS

| | | | | |
|---|---|---|---|---|
| 4,845,614 A | * | 7/1989 | Hanawa et al. | 714/16 |
| 4,989,113 A | * | 1/1991 | Asal | 710/22 |
| 5,490,287 A | * | 2/1996 | Itoh et al. | 455/41.3 |
| 5,625,847 A | * | 4/1997 | Ando et al. | 710/60 |
| 5,732,250 A | * | 3/1998 | Bates et al. | 713/600 |
| 5,850,555 A | * | 12/1998 | Qureshi et al. | 710/260 |
| 6,477,596 B2 | * | 11/2002 | Miura et al. | 710/107 |

OTHER PUBLICATIONS

Intel®, Connecting the Intel PXA27x Processor Family to a Hard-Disk Drive via the VLIO Memory Interface, Application Note, Oct. 2005, Intel.
QuickLogic®, QuickLogic QuickIDE Bridge User Manual, 2006, QuickLogic.
Maxtor Corporation, Information Technology-AT attachment with Packet Interface-5, Feb. 2000, Maxtor Corporation.
Intel®, Intel PXA27x Processor Family Developers Manual, Jan. 2006, Intel.

* cited by examiner

*Primary Examiner*—Henry W. H. Tsai
*Assistant Examiner*—Elias Mamo
(74) *Attorney, Agent, or Firm*—Workman Nydegger

(57) ABSTRACT

A computerized system is described (i) which includes an interface connected with a peripheral device and (ii) which is incapable of dynamically extending bus cycle timing if required by the peripheral device to carry out a particular current operation. This computerized system includes a given peripheral device which, during normal operation of the device, can require an extension of bus cycle timing to carry out the current operation. This device generates a specific signal when the extension is required. The device is connected with the interface of the computerized system and the system is configured to cause the system (i) to recognize the specific signal and (ii) to instruct the peripheral device to retry the current operation responsive to the specific signal. In a particular embodiment, the peripheral device is a disk drive having an ATA interface and the specific signal generated by the disk drive is an IORDY signal.

23 Claims, 3 Drawing Sheets

PERIPHERAL DEVICE IN A COMPUTERIZED SYSTEM AND METHOD

FIELD/BACKGROUND

The present invention relates generally to computerized systems and more particularly to connecting/interfacing hard disk drives having standard ATA interfaces to microprocessors (or other such devices/systems) which have generic memory interfaces, but which do not implement all the features/requirements of the ATA interface.

The need to interface ATA hard disk drives (as well as other types of peripherals) with non-ATA type computerized systems comes about from the continuing trend to integrate miniature hard disk drives into a wider variety of portable consumer electronic devices where, traditionally, hard disks have not been used and where there is no standard hard disk interface (such as ATA) available. It would therefore be an advantage to be able to connect a hard disk drive to existing generic external bus interfaces (such as an external memory bus) on microprocessors commonly used in portable consumer electronic devices such as cell phones, MP3 players, digital video recorders, PDAs, etc. The advantage comes from being able to create new products with hard disk storage quickly, minimizing costs by not requiring a separate interface with additional pins, and eliminating the need to go out and design new ICs, etc.

Keep in mind that there are microprocessors and other such computerized systems that do, indeed, include ATA interfaces, as exemplified by system 7 shown in FIG. 1. As seen there, a host 8 is shown including its own ATA interface 9. For purposes of simplicity, the term "host" is used to denote any device which the disk drive (or other such peripheral) is connected to via some type of interface such that the device and the peripheral cooperate with one another in the manner described herein. As indicated above, the host could be, for example, a microprocessor as part of a computer or other such computerized system. Given the host 8 includes an ATA interface 9, no problems arise in connecting an ATA type device, for example disk drive 10, to the host 8 via the ATA interface 9, at least as far as the present disclosure is concerned, as will be discussed hereinafter. For completeness, System 7 is shown including a non-ATA interface, specifically an external memory interface 11, for other memory devices and other such peripherals 12.

As will be described in more detail hereinafter, the problem arises where the particular peripheral being interfaced with the host has an ATA interface, for example, ATA disk drive 10, but where the host itself does not have its own ATA interface to support the connection. In this case, it is often possible to connect the ATA disk drive to a different interface on the host, such as an external memory interface on the host as shown in FIG. 2, however this type of connection has up until now required that the external memory interface 26 have available all of the signals required by the ATA Interface 30 on ATA disk drive 28. As an example, consider the standard ATA interface in disk drive 10, which interface contains a signal called IORDY (Input/Output Ready). This signal is either asserted or de-asserted. When data transfers are occurring between such a disk drive and a host having a cooperating ATA interface, as in FIG. 1, the host is able to recognize and act on the asserted or de-asserted IORDY signal without any problem. For example, if host 8 executes a read or write cycle to disk drive 10 and the disk drive is able to complete the request within the time cycles allotted, the IORDY signal from the disk drive to the host will be in its asserted state and remain so throughout the requested task. On the other hand, if because of internal conditions, the disk drive cannot service the read or write access cycle on the ATA interface bus within the allotted or usual cycle time, the disk drive causes the IORDY signal to be switched to its de-asserted state which, in essence, means that the disk drive is asking the host to dynamically extend the bus cycle time in order for the disk drive to carry out the particular operation in question. In the case where the host includes a cooperating ATA interface, as in the case of host 8, this is not a problem. The host will respond by providing the necessary dynamic extension. On the other hand, where the host does not have a cooperating ATA interface, and the disk drive must be connected to an interface bus which has no signal equivalent to IORDY available, no extension will be made available and the probable result is that the task in question will not be completed correctly and some data will be lost or corrupted. That, of course, is a problem which is considered to be resolved, in conjunction with providing still further advantages.

The foregoing examples of the related art and limitations related therewith are intended to be illustrative and not exclusive. Other limitations of the related art will become apparent to those of skill in the art upon a reading of the specification and a study of the drawings.

SUMMARY OF THE DISCLOSURE

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention addresses the lack of compatibility problem between an ATA type of peripheral that generates an IORDY signal (or like signal) and a host which is not ATA compatible and, hence, does not recognize or know what to do with an IORDY (or like) signal when the latter signal is requesting additional cycle time to complete a particular task.

As will be described in more detail hereinafter, there is disclosed herein a computerized system (i) which includes an interface for connection with a peripheral device and (ii) which, as indicated above, is incapable of dynamically extending bus cycle timing if required by the peripheral device in order to carry out a particular current operation. This computerized system includes a given peripheral device which, during normal operation of the device and under certain circumstances, requires an extension of bus cycle timing in order to carry out properly the current operation in cooperation with the computerized system. This peripheral device is configured to generate a specific signal when the extension is required in order to complete carrying out the current operation. In accordance with the present disclosure, the given peripheral device is connected with the interface of the computerized system and the system itself is configured in a way which causes the system (i) to recognize the specific signal when the latter is generated and (ii) to instruct the peripheral device to retry carrying out the current operation in response to the presence of the specific signal. In accordance with a particular embodiment of the present disclosure, the peripheral device is a disk drive having its own ATA interface and the specific signal generated by the disk drive is an IORDY signal.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein including alternatives, modifications and equivalents, as defined within the scope of the appended claims. It is noted that the drawings are diagrammatic in nature in a way that is thought to best illustrate features of interest. Further, like reference numbers are applied to like components, whenever practical, throughout the present disclosure. Descriptive terminology has been adopted for purposes of enhancing the reader's understanding, with respect to the various views provided in the figures, and is in no way intended as being limiting.

Figure 1:
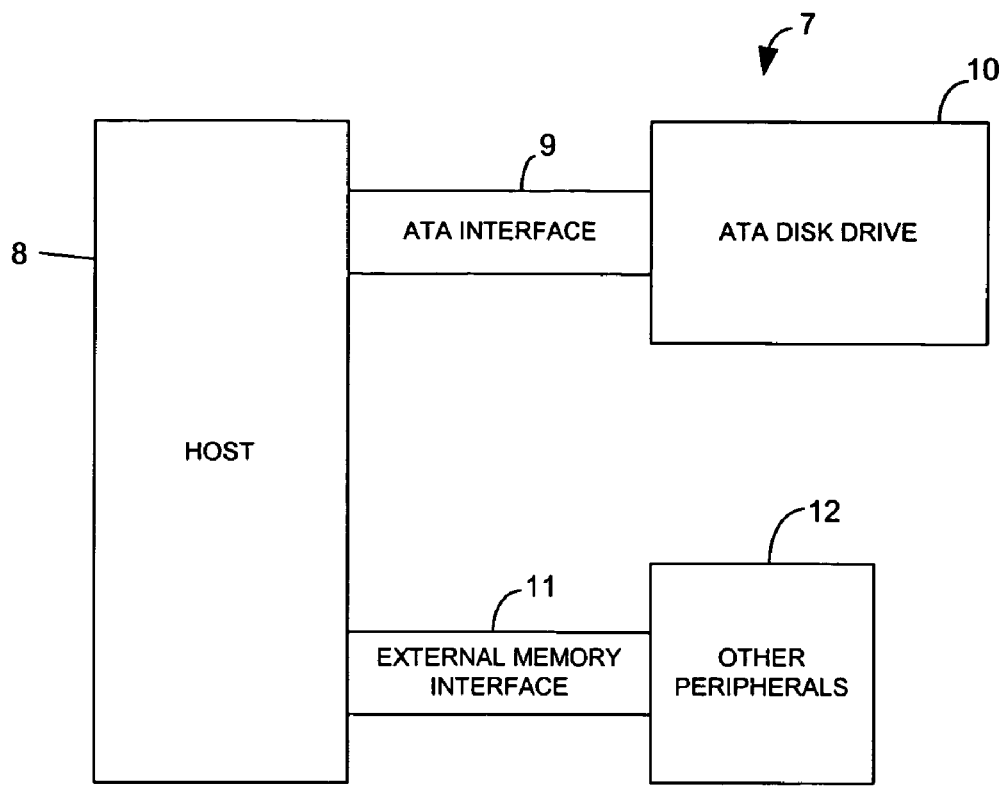
FIG. 1 is a diagrammatic illustration of a computerized system in accordance with the prior art and particularly a prior art computerized system which includes an ATA interface and which is shown interfacing with an ATA disk drive.
Figure 2:
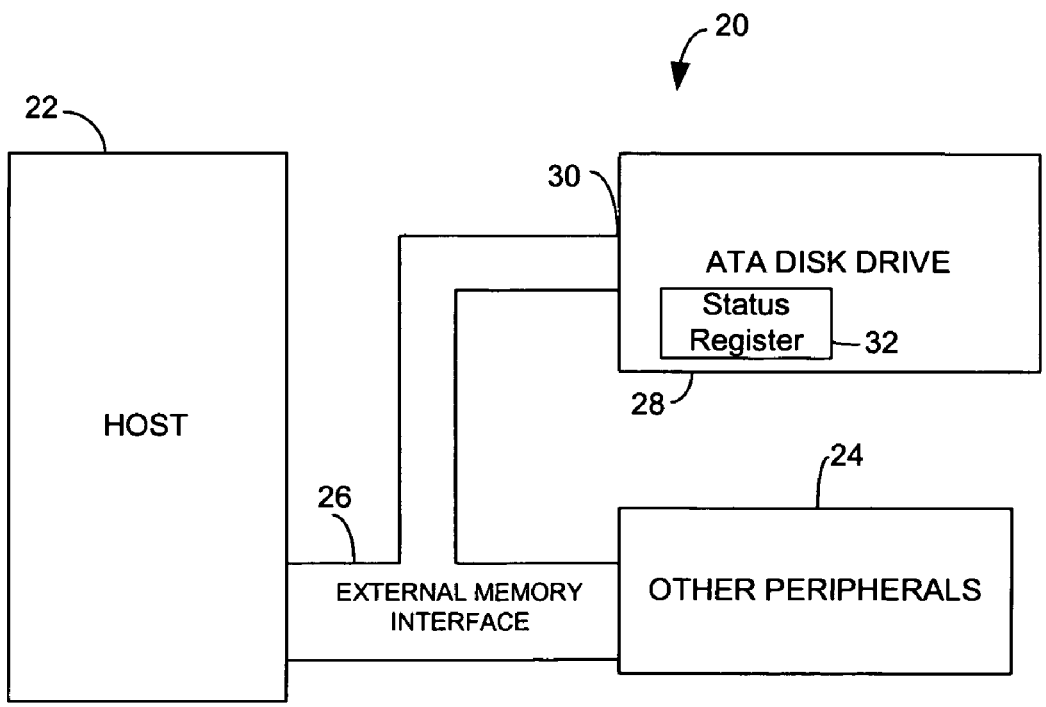
FIG. 2 is a diagrammatic illustration of a computerized system designed in accordance with the present invention and particularly one which does not include an ATA interface, but which is shown interfacing with an ATA disk drive.

Having discussed briefly the prior art computerized system of FIG. 1, attention is now directed to the computerized system of FIG. 2. This system, generally indicated by the reference number 20, is shown including a host 22. As stated previously, what we mean by "host" is any device which the disk drive (or other appropriate peripheral device) is connected to via the ATA interface of the disk drive (or other such device) in order to cooperate in the manner disclosed here. The host 22 could be a system or a microprocessor, or some kind of specialized IC providing an interface connection and, in any case such an IC would be part of the computerized system or the system itself. A typical case would be where the host is a microprocessor or ASIC containing a microprocessor core. In any event, in the case of computerized system 20 of FIG. 2, host 22 is one that has a well known non-ATA interface.

Still referring to FIG. 2, host 22 is shown connected with memory and/or other peripheral devices 24 via its non-ATA interface generally indicated at 26. In addition, interface 26 is used to connect ATA disk drive 28 (corresponding to disk drive 10 in FIG. 1) with the host by means of the ATA disk drive interface 30. An initial problem here, of course, is: how do you connect an ATA interface disk drive, for example disk drive 28, to a host which has no ATA interface available such as, for example, host 22. It turns out that the PIO mode of accesses on the ATA interface of the disk drive are similar to I/O accesses on host external memory interfaces such as interface 26. Therefore, if a host can provide the same set of signals as required for ATA PIO mode access and if the host can also provide timing on those signals which matches the ATA specification requirements, then it is possible for a host to communicate successfully with an ATA disk drive even though the host does not support a standard ATA interface. For purposes of subsequent discussions, it is appropriate to note that drive 28 includes a register arrangement 32 such as, for example, task file registers.

Applicant has determined that even though the processor (for example, host 22) can provide a full set of signals but cannot exactly meet the ATA signal timing requirements, the disk drive (ATA disk drive 28) can still be connected/interfaced successfully because the particular disk drive has been designed to support a wider range of timings on the interface than are strictly spelled out in the ATA specification. Thus, in the first instance, the present disclosure assumes that the ATA disk drive 28 or any other pertinent peripheral device is able to communicate with the non-ATA interface 26 of host 22. Indeed, the specific problem addressed here is where host 22 can meet the signal timing or other such requirements of ATA disk drive 28 (or other such peripheral device), and may or may not have most of the required signals available, and yet does not, in any event, have one critical signal, namely IORDY.

In a more general sense, the problem addressed by this disclosure is where the host is one which is incapable of dynamically extending bus cycle timing if required by the peripheral device in order to carry out a particular current operation. For purposes of clarity, however, much of the present disclosure will discuss this problem in regard to the IORDY signal in an ATA vs. a non-ATA environment. In this regard, it is to be understood that the present invention is equally applicable to a peripheral device, for example a disk drive, having an interface other than an ATA interface where you have an IORDY-like problem described herein in which the host does not support the particular interface of the peripheral device. As will be seen, where the peripheral device requires more time to complete a task being undertaken, the host, when notified by an appropriate signal, will cause the peripheral to retry the task.

As stated immediately above, the standard ATA interface 30 forming part of ATA disk drive 28 contains a signal called IORDY which is used to dynamically extend cycle timing of, for example, read/write access cycles from the host 22. In this regard, note that the host controls the bus cycle timing by extending the length of time certain bus control signals such as DIOR- and DIOW- are asserted during read/write access cycles on the bus. Also, keep in mind that these are the ATA names. Equivalent/generic microprocessor external memory bus names might be -OE (output enable) and -WE (write enable), respectively. Further, keep in mind that it is the host that controls the bus cycle timing. After a specific access cycle is started, disk drive 28 may not be able to complete its current operation in the usual amount of time. For example, if an access by the host occurs simultaneously with a data transfer to/from the rotating disk, the disk drive must first complete the data transfer to/from the rotating disk because the disk rotation cannot be slowed or delayed. In this case, the disk drive must delay its response to the host access by using its IORDY signal to indicate to the host that the timing must be extended for the present cycle. The IORDY signal is de-asserted to accomplish this. In the case of a host that is able to recognize and respond to an IORDY signal in accordance with ATA guidelines, there is no problem. The host reacts by extending the cycling time until the disk drive asserts IORDY, at which time the host completes the cycle. Unfortunately, as indicated above, host 22 is not able to extend bus cycles by recognizing that the IORDY is de-asserted. Incidentally, the use of a ready signal in and by itself is well known and is implemented in various kinds of peripheral devices which cannot always provide data access with exact timing. Disk drives, of course, are one example as are certain semi-conductor memory devices as well as other devices. While the present disclosure focuses on the disk drive, it is to be understood that the present invention is not limited to disk drives.

In order to better appreciate the present invention, let us examine what occurs in the event that an IORDY signal in its de-asserted state is generated by the disk drive, but not implemented by the host. We will start from the beginning. Assume that the host requests a data transfer to or from the disk drive. Further assume that the disk drive realizes it needs more cycle time and, therefore, de-asserts IORDY. Clearly, given the fact that the host in this scenario does not recognize the IORDY signal, it obviously will not extend the bus cycle and, therefore, the data being transferred on this particular bus cycle will be lost or corrupted. Therefore, if a host does not grant an extension to the bus. cycle as requested by the disk drive when the disk drive de-asserts IORDY, some alternative method must be found to prevent data loss or damage. Unfortunately, there is no prior art method to solve this problem, at least to the best of Applicant's knowledge. The IORDY signal/function must be implemented as an integral part of the host's bus timing and control logic. It is not possible to create an IORDY-like function from general I/O signals such as the usual GPIOs (General Purpose Input/Outputs) which are found on the non-ATA host, again to the best of Applicant's knowledge. Moreover, as will be seen hereinafter, the present invention does not attempt to implement IORDY-like functions from general I/O signals at the host. Rather the present invention provides an economical and reliable alternate approach to prevent data loss and damage under these circumstances.

As will become clear hereinafter, the present invention takes advantage of the fact that in modern disk drives the IORDY signal is rarely de-asserted, that is, it is rarely used by these modern disk drives to request an extension of bus cycle timing in order to carry out properly a particular operation in cooperation with the host. There are a number of reasons for this. Many years ago, when logic devices had lower speeds, there were more opportunities for the kind of delays inside a disk drive which required the de-assertion of IORDY. These kinds of delays usually involve contention for access to the disk drive's buffer RAM. For example, the host bus cycle would need to be extended/delayed if the disk drive buffer RAM had to service and access from the disk read/write sub-system first. Today, the logic devices used in disk drives are designed to operate at much higher speeds and can be clocked at higher frequencies, thus reducing the probability for contentious situations of the type described. Nevertheless, on occasion contentious situations do arise requiring the disk drive (or other such peripheral device) to make the demand for extended bus cycle time. In the case of disk drive 28, while the disk drive indeed generates a de-asserted IORDY signal under those circumstances, knowing that the non-ATA host cannot implement the de-asserted IORDY request in the normal way, the de-asserted IORDY signal is nevertheless generated to tell the host that more bus cycle time is required and that, as a result, data in the current operation may be lost or corrupted.

In accordance with the present invention, host 22, rather than being designed to grant the extension, takes the action to retry the data transfer operation in question. In other words, if the disk drive is requested to read or write data, for example, requiring additional bus cycle time and, as a result, generates a de-asserted IORDY signal, the host retries that particular data transfer operation. Because the probability of IORDY being de-asserted again in the retry data transfer is low (because its presence is rare in the first place), the retry operation will likely succeed thus ensuring good data is ultimately transferred. Moreover, because the probability of IORDY being de-asserted is generally low, these retries will be rare and will not cause a noticeable impact to the overall data transfer rate performance.

One aspect of the present invention is the recognition by Applicant that it is not necessary to re-design the host in order to respond in an ATA-like manner, that is, to respond by granting an extension of the bus cycle timing in order that the disk drive (or other such peripheral) is able to carry out properly a particular operation requested by the host. Another aspect of the present invention is the recognized importance by Applicant that de-asserted IORDY signals are rare in the first place. Still another aspect of the present invention is Applicant's recognition that the very objective in mind, that is, to prevent data from being lost or corrupted, can be achieved merely by causing the host to retry the request with the knowledge that it will be very unlikely that such a retry request will itself require additional bus cycling time, that is, require another retry.

Figure 3:
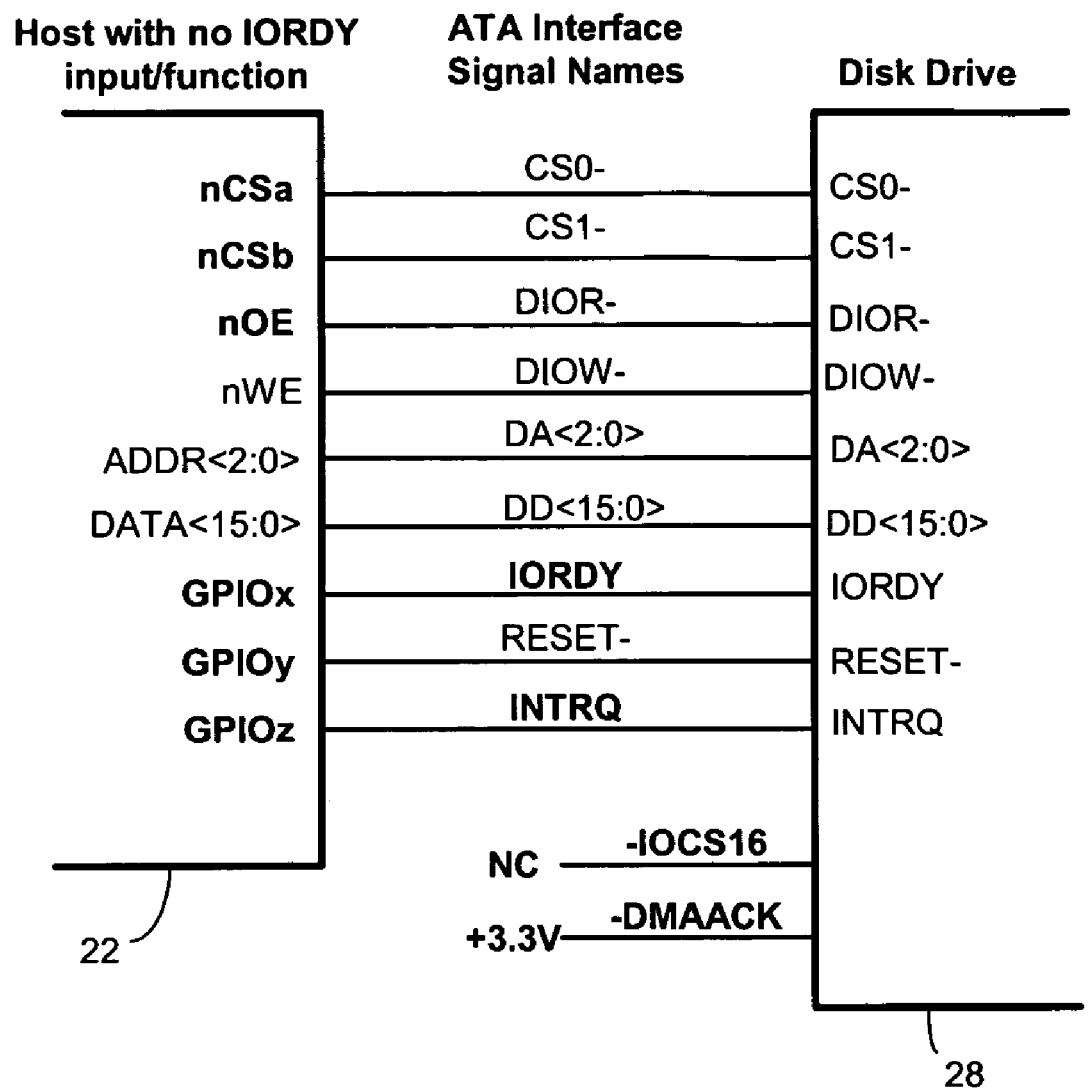
FIG. 3 diagrammatically illustrates the way in which the ATA disk drive shown in FIG. 2 interfaces with a computerized system which has no ATA interface.

In view of the foregoing, it is important to the present invention that the IORDY signal from disk drive 28 be connected to some input on host 22 which can be easily monitored by the software running on the host. If the host is a microprocessor, the IORDY signal could, for example, be connected as an interrupt input signal or a GPIO signal where the GPIO input has been configured as an interrupt input (microprocessors are typically capable of this kind of configuration on their GPIOs). FIG. 3 illustrates this kind of connection. As seen there, the host 22 (with no IORDY input/function) is shown including three general purpose input outputs, namely, $GPIO_x$, $GPIO_y$, and GPIOz, each of which (or at least one of which) is configured as an interrupt input to the host. At the same time, disk drive 28 is shown having, among other inputs/outputs, IORDY connected with $GPIO_x$. While FIG. 3 specifically illustrates IORDY connected to a host signal ($GPIO_x$) which acts as an interrupt input, connection to a non-interrupt signal (such as a GPIO which is not configured as an interrupt input) is possible. In the case where the $GPIO_x$ is configured as an interrupt input, it is in this case configured as a negative edge sensitive interrupt input to the host, preferably.

While the connection to a non-interrupt signal (for IORDY) is possible, actually, connection to a non-interrupt signal would not be very useful because a non-interrupt signal (such as a non-interrupt GPIO) would typically have no means to sense and "remember" that the brief/transient de-assertion of IORDY has occurred. In other words, the software running on the host would not, in a practical sense, be able to sample the condition of the signal on the non-interrupt GPIO frequently enough to ensure that the brief/transient de-assertion of IORDY would be noticed/captured. The only practical method for the host to notice/capture the brief transient de-assertion, is to implement a latching circuit. Non-interrupt GPIOs typically do not have a latching circuit/function, however when GPIOs are configured as interrupt inputs, they almost always latch the occurrence of the interrupt condition (this is simply the nature of how interrupts work). Therefore, by default, a GPIO which can be configured as an interrupt has the necessary latching function, whereas a GPIO which is not configured (or is not configurable) as an interrupt will likely not have the needed latching function. In the case where a GPIO is not configured (or is not configurable) with a latching function, an external latch circuit can be added as will be recognized to one skilled in the art.

With FIGS. 2 and 3 in mind, attention is now directed to a description of the way in which the overall computerized system functions in regards to the present invention. In the first instance, host 22 sends READ SECTORS commands to disk drive 28. The host then goes into a wait state where it is either polling the disk drive status register (waiting for a certain combination of status bits), or the host goes into an idle state (with respect to the disk drive access) where it is waiting for an interrupt from an INTRQ signal to occur. The disk drive prepares a sector of data for transmission to the host (seeks to track, reads data from the disk into buffer RAM in the disk drive controller). The disk drive indicates that the data sector is ready by setting status bits in task file status register 32 and (if enabled) also asserts the INTRQ signal. Thereafter, the host responds to either the status bits or the INTRQ signal (this depends on the host design, either method can be used) and transfers the sector of data from the disk drive into the host, one word at a time, by performing multiple read cycles on the interface bus. It is during this step that the IORDY signal might be de-asserted. If all sectors for the READ SECTORS command have been transmitted then the process ends successfully. Otherwise, the process loops back to the point where the host goes into a wait state or an idle state, as recited above.

In accordance with the present invention, a specific step is added somewhere in the sequence described immediately above, specifically where the host checks to determine if an interrupt has occurred due to IORDY becoming de-asserted at any point during the transfer of data. Reiterating the process described but with this step included, we will start with the host sending READ SECTORS commands to the disk drive. It is here that the host enables the IORDY de-assert interrupt which we will assume is present at the $GPIO_x$ input to the host. The host (software) goes into a wait state where it is either polling the disk drive status register (waiting for a certain combination of status bits), or the host goes into an idle state (with respect to the disk drive access) where it is waiting for an interrupt from the INTRQ signal to occur. The disk drive prepares a sector of data for transmission to the host (seeks to track, read the data from the disk into buffer RAM in the disk drive controller). The disk drive indicates that the data sector is ready by setting status bits in task file status register 32 and (if enabled) also asserts the INTRQ signal. Thereafter, the host responds to either the status bits or the INTRQ signal and transfers the sector of data from the disk drive into the host one word at time by performing multiple read cycles on the interface bus. It is again during this step that the IORDY signal might be de-asserted. In accordance with the present invention, it is also here that the host checks to see if the interrupt occurred from IORDY de-assertion on the $GPIO_x$. If, in fact, it did, then the read command is aborted and started all over again as a retry. If not, then the process continues to completion.

The sequence just described above represents one embodiment. However, other variations are possible. For example, in the step where the host checks to see if an interrupt occurred from the IORDY de-assertion on the GPIOx input, that step could be relocated to occur once at the very end of the sequence transferring all sectors, or the host could check to see if an interrupt occurred from the IORDY de-assertion just after each individual sector is transferred. Another variation resides in the use of a status register wherein a particular bit can be set to a predetermined value that indicates the state of IORDY. Moreover, while most of the host actions in the above sequence would be carried out by software running in the host, it would be possible to implement these actions in hardware, or a combination of software and hardware. Further, while the above sequence shows what occurs for a READ SECTORS command, the present invention would apply to other ATA data transfer commands such as IDENTIFY DEVICE, WRITE SECTORS, READ MULTIPLE, WRITE MULTIPLE, as well as other commands. The method to detect de-assertions on IORDY would be similar in all cases.

Figure 4:
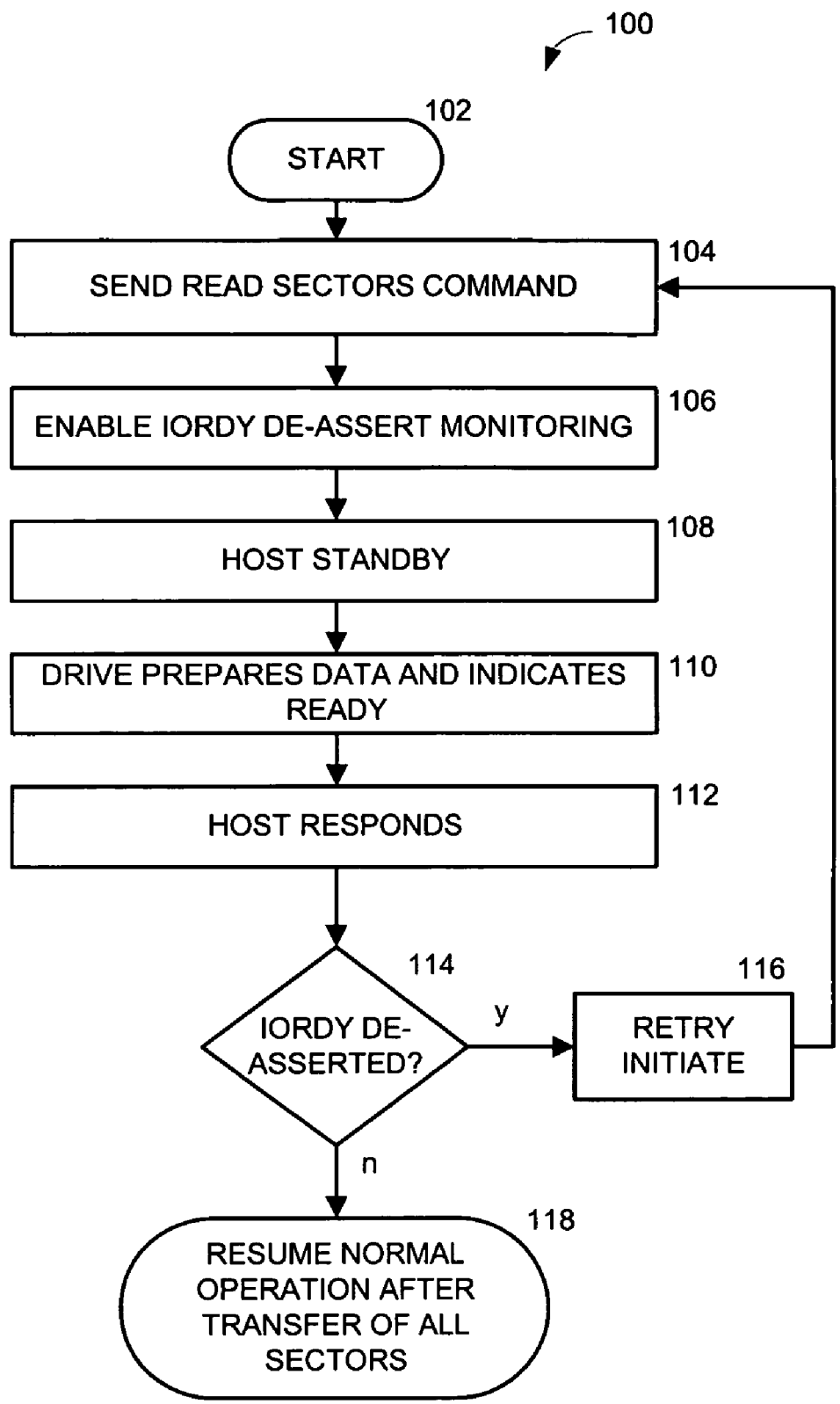
FIG. 4 is a flow diagram that illustrates one embodiment of a method for interfacing a system, having a non-ATA interface, to an ATA disk drive.

Turning to FIG. 4, in conjunction with FIGS. 2 and 3, an exemplary embodiment of the method of the present invention is generally indicated by the reference number 100 and will be described briefly, in view of the detailed discussion provided immediately above. Following start 102, step 104 sends the READ SECTORS command. Step 106 then enables IORDY de-assert monitoring which may utilize, for example, monitoring of an interrupt or register. It is noted again that this step should occur prior to any likelihood of de-assertion of IORDY. Host standby 108 is then entered wherein the host monitors some expedient that indicates readiness of the drive to engage in the transfer, for example, using the INTRQ line of FIG. 3 or status register 32 (FIG. 2). At 110, drive 28 prepares data for transfer, based on the READ SECTORS command and indicates its readiness to engage in a transfer, using aforementioned register 32 or INTRQ. At 112, the host responds, such that the transfer begins and there is a potential for occurrence of IORDY de-assertion. Thereafter, step 114 monitors for IORDY de-assertion throughout the data transfer. If IORDY is de-asserted, step 116 initiates a retry by causing step 104 to resend the READ SECTORS command. Alternatively, step 118 confirms a normal data transfer and normal operation continues.

It is to be understood that the discussion immediately above has been provided for exemplary purposes only. There are, of course, other commands from the host to the disk drive, for example, READ and WRITE MULTIPLE commands (as indicated immediately above) that can be processed in accordance with the present invention. Moreover, if the host input signal can be configured only as a positive edge sensitive interrupt (as contrasted with the negative edge sensitive interrupt recited above), then an inverter device can be added between the disk drive and the host to invert the IORDY signal. If the host input signal can only be configured as a readable GPIO input, then a negative edge sensitive latch circuit could be added between the disk drive and the host, to latch the de-assertion of the IORDY signal. In this latter case, the host would check the level of this GPIO input rather than check that an interrupt has occurred. Additionally, the host would need to reset the latch at the end of a command by use of an additional GPIO signal connected to the latch reset input.

In view of the teachings herein, these modifications would be obvious to one with ordinary skill in the art. In addition to these variations recited here, it is to be understood that the present invention is not limited to a computerized system in which host 22 corresponds to a microprocessor and in which the peripheral device of interest is disk drive 28. Indeed, the present invention contemplates other hosts and other peripheral devices, as indicated above, so long as the following is true. First, the host or the computerized system generally is one (i) which includes an interface for connection with the peripheral device and (ii) which is incapable of dynamically extending bus cycle timing if required by the peripheral device in order to carry out a particular current operation. Second, the peripheral device itself is one which, during normal operation and under certain circumstances, requires an extension of bus cycle timing in order to carry out properly a particular operation in cooperation with the computerized system. The peripheral device, in this case, is configured to generate a specific signal when the extension is required in order to complete carrying out the current operation. Third, the peripheral device is connected with the interface of the computerized system and the system itself is configured in a way which causes the system (i) to recognize the specific signal when the latter is generated and (ii) to instruct the peripheral device to retry carrying out the current operation in response to the presence of the specific signal.

Although each of the aforedescribed physical embodiments have been illustrated generally, it should be stood that the present invention may take on a variety of specific configurations with the various components being arranged and interconnected in alternative ways, while still applying the teachings that have been brought to light in the foregoing descriptions. Furthermore, the methods described herein may be modified in an unlimited number of ways, for example, by reordering the various sequences of which they are made up. Therefore, the present examples are to be considered as illustrative and not restrictive, and the invention is not to be limited to the details given herein but may be modified within the scope of the appended claims.

What is claimed is:

1. In a computerized system (i) which includes an interface for connection with a peripheral device and (ii) which is incapable of dynamically extending bus cycle timing if required by the peripheral device in order to carry out a particular current operation, a method comprising:
    (a) providing within said system a given peripheral device which requires an extension of bus cycle timing in order to carry out properly the current operation in cooperation with said computerized system, said given peripheral device being configured to generate a specific signal when said extension is required in order to complete carrying out the current operation; and
    (b) connecting said given peripheral device with the interface of said computerized system such that an output on said given peripheral device for sending said specific signal is connected to an interrupt input of said interface and configuring said system in a way which causes the system (i) to recognize said specific signal through the interrupt input when said specific signal is generated and (ii) to instruct the given peripheral device to retry carrying out the current operation in response to the presence of said specific signal.

2. A method according to claim 1 wherein said given peripheral device is a disk drive.

3. A method according to claim 2 wherein said disk drive includes an ATA interface for connection with the interface of said computerized system and wherein said last-mentioned interface is not an ATA interface.

4. A method according to claim 3 wherein said disk drive is configured to generate an IORDY signal in either an assertion or de-assertion mode, the latter serving as said specific signal whose function is to request a dynamic extension of bus cycle timing of the computerized system when such extension is necessary.

5. A method according to claim 4 wherein said IORDY signal is used in a PIO access mode.

6. method according to claim 1 wherein said interrupt input is configured as a negative edge sensitive interrupt input.

7. A computerized system, comprising:
    (a) a host (i) which includes an interface for connection with a peripheral device and (ii) which is incapable of dynamically extending bus cycle timing if required by the peripheral device in order to carry out a particular current operation; and
    (b) a given peripheral device which, during normal operation of the device and under certain circumstances, requires an extension of bus cycle timing in order to carry out properly the current operation in cooperation with said computerized system, said given peripheral device being configured to generate a specific signal when said extension is required in order to complete carrying out the current operation;
    (c) wherein said given peripheral device is connected with the interface of said computerized system such that an output on said given device for sending said specific signal is connected to an interrupt input of said interface, and wherein said system is configured in a way which causes the system (i) to recognize said specific signal through the interrupt input when said specific signal is generated and (ii) to instruct the given peripheral device to retry carrying out the current operation in response to the presence of said specific signal.

8. The system according to claim 7 wherein said given peripheral device is a disk drive.

9. The system according to claim 8 wherein said disk drive includes an ATA interface for connection with the interface of said computerized system and wherein said last-mentioned interface is not an ATA interface.

10. The system according to claim 9 wherein said disk drive is configured to generate an IORDY signal in either an assertion or de-assertion mode, the latter serving as said specific signal whose function is to request a dynamic extension of bus cycle timing of the computerized system when such extension is necessary.

11. The system according to claim 10 wherein said IORDY signal is used in a PIO access mode.

12. The system according to claim 7 wherein said interrupt input is a negative edge sensitive interrupt input.

13. In a computerized system, a method comprising:
    providing a host (i) which includes an interface for connection with a peripheral device and (ii) which is incapable of dynamically extending bus cycle timing if required by the peripheral device;
    providing a given peripheral device which, during normal operation of the device and under certain circumstances, requires an extension of bus cycle timing in order to carry out properly a particular current operation in cooperation with said computerized system, said given peripheral device being configured to generate a specific signal when said extension is required in order to complete carrying out the current operation; and
    connecting said interface such that an output on said given peripheral device for sending said specific signal is connected to an interrupt input of said interface in a way which causes the system (i) to recognize said specific signal through the interrupt input when said specific signal is generated and (ii) to instruct the given peripheral device to retry carrying out the current operation in response to the presence of said specific signal.

14. A computerized system, comprising:
    (a) a host (i) which includes an interface adapted for connection with a peripheral device and (ii) which is incapable of dynamically extending bus cycle timing if required by the peripheral device, said peripheral device being one which, during normal operation of the device and under certain circumstances, requires an extension of bus cycle timing in order to carry out properly a particular current operation in cooperation with said computerized system, said device being one which is configured to generate a specific signal when said extension is required in order to complete carrying out the particular current operation; and (b) wherein the interface of said computerized system is adapted for connection with said peripheral device, and said interface being configured such that an output on said given device for sending said specific signal is connected to an interrupt input of said interface in a way which causes the system (i) to recognize said specific signal through the interrupt input when said specific signal is generated by said peripheral device and the interface is connected with the device and (ii) to instruct the peripheral device to retry carrying out the current operation in response to the presence of the specific signal.

15. A computer system comprising:

a host bus;

a processor operatively coupled to the host bus and configured to transmit operation requests over the host bus and receive responses from the host bus synchronously with a bus cycle having a fixed bus cycle period; and a peripheral device operatively coupled to the host bus and configured to receive the operation requests and to generate responses having a variable response time, a portion of the responses having a response time exceeding the fixed bus cycle period, the peripheral device configured to transmit a first signal to the processor for responses having the response time thereof exceeding the fixed bus cycle period;

wherein the processor has an interrupt configured to receive the first signal, the processor programmed to respond to the interrupt by instructing the peripheral device to repeat responses to operation requests corresponding to the responses having the response time thereof exceeding the fixed bus cycle period.

16. The computer system of claim 15, wherein the peripheral device is an advanced technology attachment (ATA) device and wherein the processor is a non-ATA device.

17. The computer system of claim 16, wherein the first signal is a deassertion of an IORDY output of the peripheral device.

18. The computer system of claim 17, wherein the IORDY output of the peripheral device is coupled to an interrupt of the processor.

19. A method comprising:

coupling a peripheral device to a host bus, the peripheral device having a variable response time;

coupling a host device to the host bus, the host device having a fixed bus cycle time;

transmitting an operation request from the host device to the peripheral device over the host bus;

generating a successful response to the operation request by means of the peripheral device;

if the successful response by the peripheral device has a response time exceeding the fixed bus cycle time, transmitting a first signal to the host device; and responding to the first signal by means of the host device by transmitting an instruction to the peripheral device to respond again to the operation request notwithstanding successful response by the peripheral device to the operation request.

20. The method of claim 19, wherein the peripheral device is an advanced technology attachment (ATA) device and wherein the processor is a non-ATA device.

21. The method of claim 20, wherein transmitting a first signal to the host device comprises deasserting an IORDY output of the peripheral device.

22. The method of claim 21, wherein the IORDY output of the peripheral device is coupled to an interrupt of the processor.

23. The method of claim 22, wherein the operation request is a READ SECTORS command, the method further comprising:

responding to the READ SECTORS command by the peripheral device by transmitting a second signal to the host device when data is ready to be read;

transmitting a plurality of read requests from the host device to the peripheral device;

responding to the plurality of read requests by transmitting a plurality of data words;

monitoring the IORDY output of the peripheral device; and if the IORDY output is deasserted during execution of any one of the read requests, resending the READ SECTORS command to the peripheral device.

* * * * *

UNITED STATES PATENT AND TRADEMARK OFFICE
CERTIFICATE OF CORRECTION

PATENT NO. : 7,571,266 B2  Page 1 of 1
APPLICATION NO. : 11/348079
DATED : August 4, 2009
INVENTOR(S) : Carlson It is certified that error appears in the above-identified patent and that said Letters Patent is hereby corrected as shown below:

Column 9
Line 63, insert --A-- before "method"

Signed and Sealed this

Twenty-seventh Day of October, 2009

David J. Kappos
*Director of the United States Patent and Trademark Office*